Figure 2:
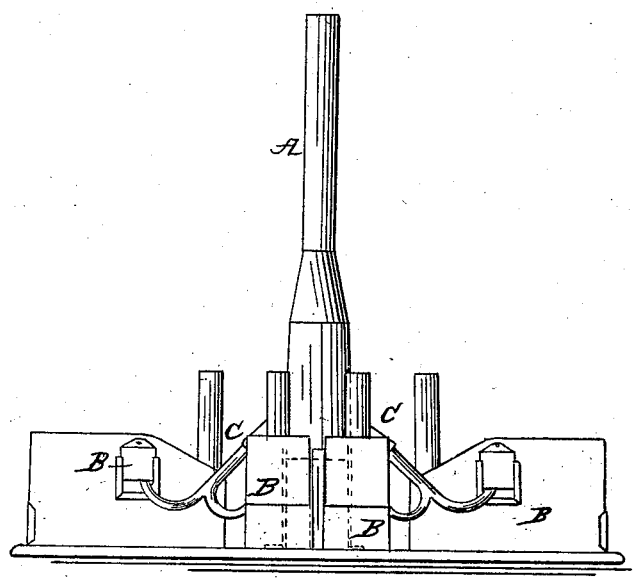
Figure 1:
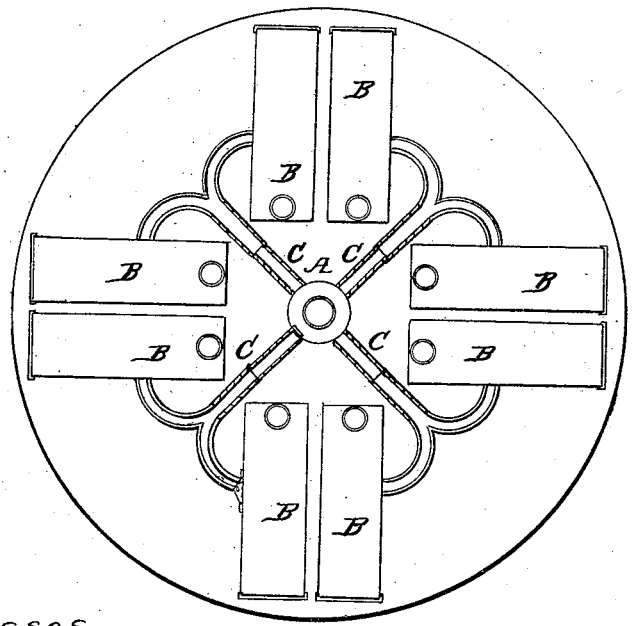

R. SAVARY.

Refining Iron.

No. 14,412.

Patented March 11, 1856.

UNITED STATES PATENT OFFICE.

RICHARD SAVARY, OF STEUBENVILLE, OHIO.

IMPROVEMENT IN PUDDLING IRON.

Specification forming part of Letters Patent No. 14,412, dated March 11, 1856.

*To all whom it may concern:*

Be it known that I, RICHARD SAVARY, of Steubenville, in the county of Jefferson and State of Ohio, have invented a new and useful Improvement in the Arrangement and Construction of Furnaces for Puddling (or Boiling) Iron; and I do hereby declare that the following is a full and exact description of the same, reference being had to the accompanying drawing and the letters of reference marked thereon.

The nature of my invention consists, first, in the combination of the cupola and puddling furnace; and, secondly, in a new adaptation of the puddling-furnace, whereby the following advantages are gained, viz: the labor and skill required in separating the balls rendered unnecessary; the iron saved in melting; uniformity produced in its mixture; the quality improved, (on account of a small quantity being worked instead of a large mass;) fuel saved in melting; the furnace for puddling saved, and the labors in that operation; the original cost of the furnace reduced; two-thirds of the room required saved, and the stealing of iron by puddlers rendered impossible.

In the annexed drawing, A represents the cupola.

B B, &c., represent the eight puddling-furnaces ranged in pairs about the cupola A.

C C, &c., represent the movable conduits (made of cast iron, fire-clay, or other convenient material) leading from the cupola A to the furnaces B B, &c., and conveying the melted metal into the furnace when a charge is required, and which may be removed after charging.

The furnaces B B, &c., are constructed on the ordinary plan of puddling-furnaces, with the exception that the hearths (or chambers into which the metal is received and worked) are of such size that they only admit sufficient iron to be worked at one time as will form a single ball, the other parts of the furnace being proportionately small.

The method of working this cupola and its group of furnaces is as follows: Sufficient iron to provide for one or more charges for the furnaces being charged into the cupola, the blast is applied and the metal melted, which runs into the lower portion of the cupola A, ready so be tapped off and conveyed by the conduit C into one or more of the furnaces B B, &c. A sufficient charge being run in, the stopper shuts off the stream, the conduit is removed, and the puddlers proceed to work the iron in the usual way until it comes to nature, when, instead of dividing it into masses to be balled separately, he rolls it up into a convenient shape and removes it from the furnace, to be worked as other puddlers' balls.

What I claim as my invention, and desire to secure by Letters Patent, is—

The arrangement of the cupola and puddling furnaces, constructed and operating as herein set forth.

RICHARD SAVARY.

Witnesses:
J. N. McINTIRE,
A. L. WHITLEY.